June 4, 1968

M. BRUMA ETAL 3,387,109

APPARATUS FOR EFFECTING OPTICAL VIEWING
AND MARKING OF A WORKPIECE

Filed July 29, 1964

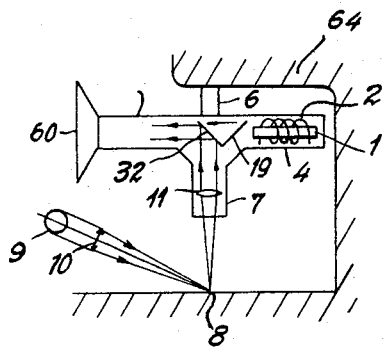
FIG.8
FIG.9
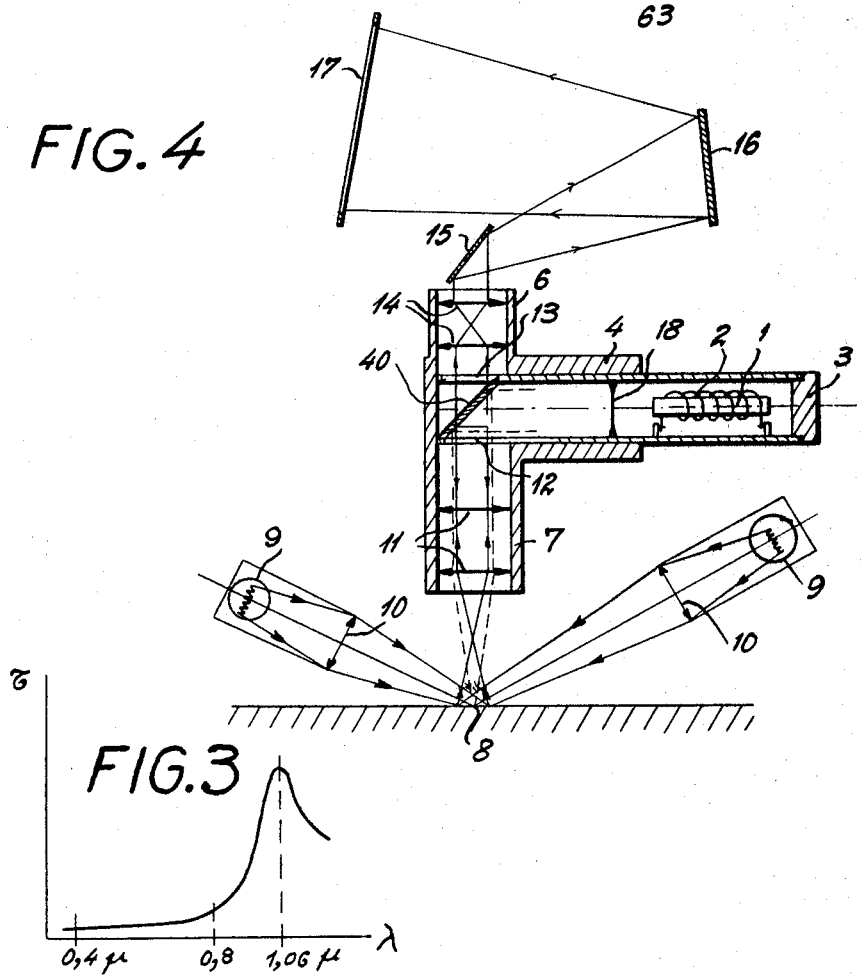
FIG.4
FIG.3

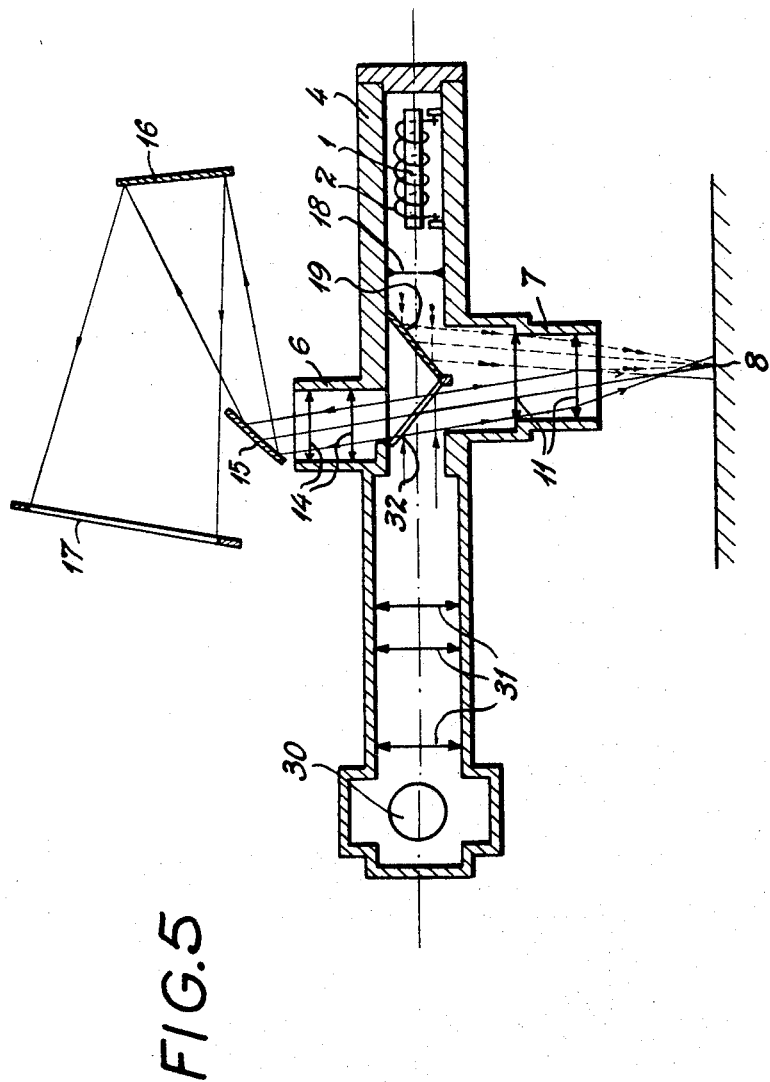

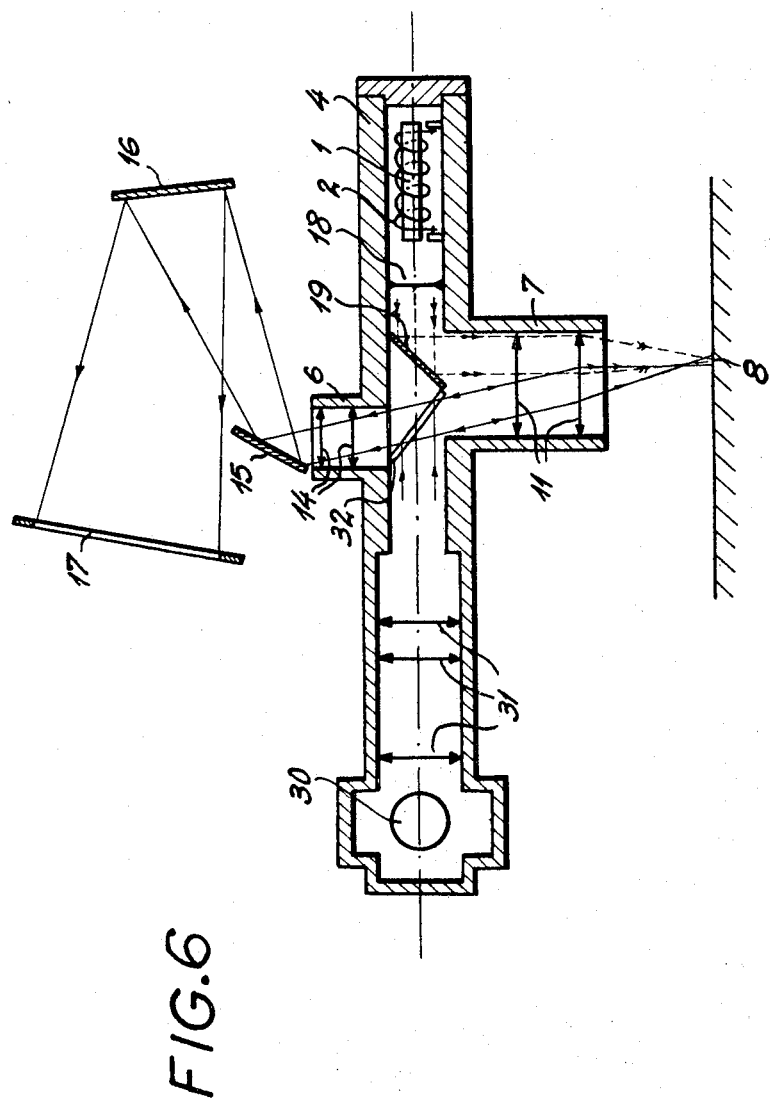

3,387,109
APPARATUS FOR EFFECTING OPTICAL VIEWING AND MARKING OF A WORKPIECE
Marc Bruma, Sceaux, and Michel F. Velghe, Gif-sur-Yvette, France, assignors to Centre National de la Recherche Scientifique, Paris, France
Filed July 29, 1964, Ser. No. 385,984
Claims priority, application France, July 30, 1963, 943,180, Patent 1,373,096
11 Claims. (Cl. 219—69)

ABSTRACT OF THE DISCLOSURE

A device for effecting optical sighting and marking of a workpiece, comprising a laser head for actually marking the workpiece in combination with an optical viewing system for positioning of the laser head such that a workpiece receives a marking at a predetermined location thereof.

---

The present invention relates to optical marking with a laser beam, and particularly with machine tools.

Conventionally, precision machining with a machine tool or the like comprises the successive steps of an optical viewing and setting and then a mechanical marking or tracing corresponding to the setting for the actual machining to be effected. This optical setting and mechanical tracing are effected by substantially separate devices operating by techniques fundamentally unrelated to each other, so that the errors of each technique become multiplied and the overall accuracy is substantially lower than that desired.

The present invention has for its object to obviate these drawbacks by effecting an optical viewing and marking by the same devices. The inherent result is that this work is effected with the accuracy associated with these devices.

According to the invention, the optical setting is followed, preferably and at least partly by means of the same device, by an optical tracing operation carried out by means of a laser head, for example combined with the said optical marking system.

The invention offers the advantage of eliminating the variations which affect only the optical viewing alone or the mechanical marking alone: for example, the expansions resulting from the heating of the optical portion by the sources of light have no effect in the system of the invention, since the mechanical tracing devices, being the same as those of the optical portion, are identically faithful.

The invention has the further advantage of eliminating wear and other principal defects of the mechanical tracing portion, since the latter, according to the invention, is effected without any physical contact and therefore without play and without stray reactions between the operating devices.

Still a further advantage of the invention is that it obviates the necessity of causing the optical viewing and the mechanical tracing to coincide. The complete fidelity of the marking according to the invention has the result that a possible fault of accuracy (of "adjustment") would have a repercussion identical with itself in magnitude and in direction, on all the points of the marking, which would thus be simply displaced in lateral movement alone with respect to the position provided for it, but would remain identically superimposable, in magnitude and direction, on its theoretical shape. The device according to the invention thus makes it possible to effect advantageously an optical viewing and an optical tracing on two parallel axes of a mechanical unit, in which case the accuracy imposed on the parallelism and therefore on the direction of the axes must be considerably greater than the accuracy of their respective positions.

According to the invention, a laser head may be associated with any conventional optical viewing device, in particular with a sighting telescope or with a device projecting an image of the object on a ground glass screen, or with an electronic image converter and with a television screen.

Forms of construction of a device permitting the carrying out of marking by a laser beam will be described below by way of example and without implied limitation, reference being made to the accompanying drawings, in which:

FIG. 3 is a characteristic curve of certain optical glasses;

FIG. 4 is a cross-section, similar to FIG. 1, of an embodiment comprising a special mirror;

FIG. 5 is a cross-section similar to FIG. 1, of a further embodiment of the invention;

FIG. 6 is a cross-section similar to FIG. 1, of a still further embodiment of the invention;

FIG. 8 is a diagrammatic view of another form of a device according to the invention mounted on a support, and FIG. 9 shows the image obtained with this device;

Figure 1:
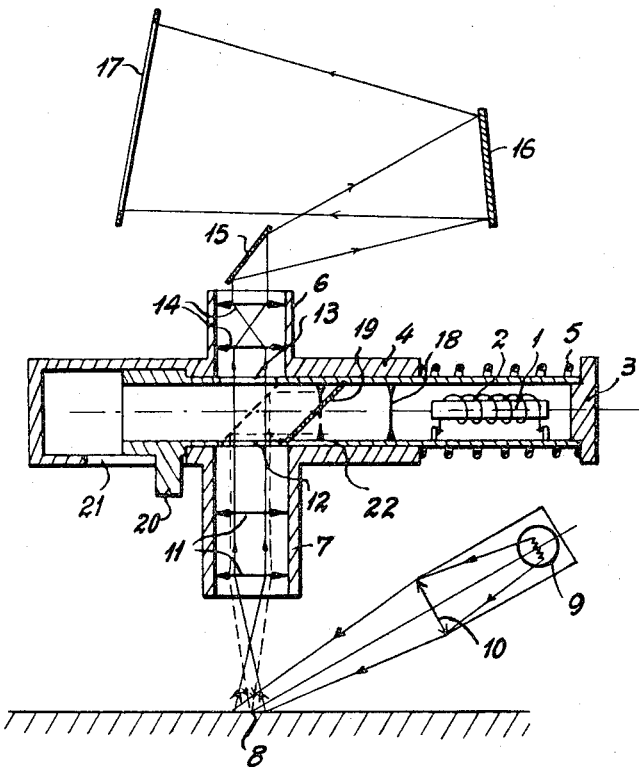
FIG. 1 is a cross-section of an embodiment of the invention with optical focussing on ground glass.

With reference to FIG. 1:

A laser head comprising an active element 1, for example a ruby or a neodymium glass, and an optical pumping device 2, for example an electronic flash tube in the form of a spiral surrounding the active element 1, are housed in a tubular chamber 3. The chamber 3 is in turn housed in a chamber 4 in which it can slide. A restoring spring 5 couples the extremities of the chamber 3 and the chamber 4. This chamber 4 comprises two coaxial tubular portions 6 and 7 having their axis perpendicular to the axis of the chamber 4. The workpiece 8 to be machined, placed for example on an object-carrier, is illuminated by the surrounding light or by any other illumination means, for example as shown in FIG. 1, as constituted by a device comprising a lamp 9 and a lens 10. The image of the workpiece 8 to be machined is transmitted by lenses 11 of the tubular portion 7, through the orifices 12 and 13 of the sliding chamber 3, and received by lenses 14 of the tubular portion 6 and then by mirrors 15 and 16, and finally is projected on a screen 17, for example, of semiground glass. The sliding chamber 3 of the laser head comprises a corrective lens 18 and a mirror 19 fixed at 45° on the axis of the chamber.

The assembly formed by the chambers 3 and 4 can be displaced with respect to the workpiece 8 to be machined, resting on an object-carrier (not shown) which can be formed either by a movable marking-off table, or by any part of the mechanical frame on which the chambers 3 and 4 are mounted.

The optical setting is then effected, the members being in the position shown in FIG. 1, the optical focussing being made, for example, by displacement of the entire device with respect to the object, or conversely, until a clear image is obtained on the semiground glass screen 17.

In order to proceed with the marking, the chamber 3 is moved towards the left of FIG. 1 (to the position shown in dotted lines) by means of a push knob 20 sliding in a slot 21 of the chamber 4; this movement closes the orifices 12 and 13 of the chamber 3 and uncovers a further orifice 22 of the chamber 3. In this position (shown in dotted lines in FIG. 1) the laser beam passes through the corrective lens 18, is reflected on the mirror 19 fixed at 45° on the axis of the chamber 3, and passes through the orifice 22 and the lenses 11 so as to converge at 8 on the workpiece to be machined, this convergence being obtained by the corrective lens 18.

It should furthermore be observed that it is not necessary for the optical beam and the laser beam to be exactly focussed on the same point of the object. The systematic error of the device can be determined in fact by a single experiment, and it is only necessary to take it into account in subsequent operations. However, this systematic error will preferably be corrected once and for all.

Figure 2:
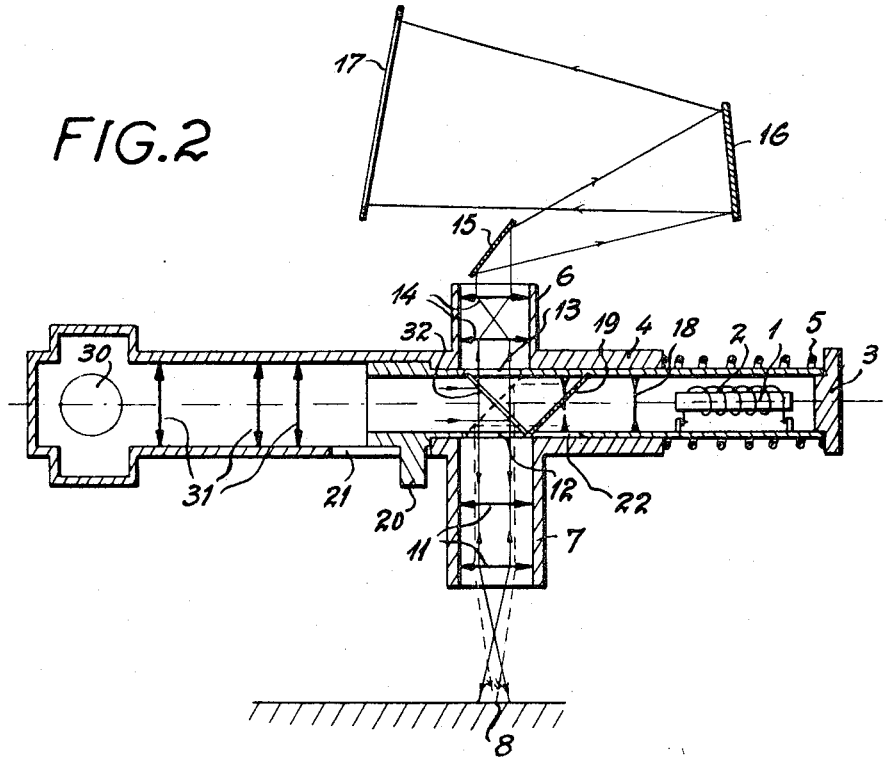
FIG. 2 is a cross-section similar to that of FIG. 1, but with an incorporated lighting system.

A further application of the invention will be described with reference to FIG. 2. There will again be seen the same parts with the same references as in FIG. 1, but the external lighting device is replaced by a built-in lighting system. The latter is housed in an extension of the chamber 4 and comprises a lamp 30, the light from which is sent through the lenses 31, a semi-transparent mirror 32 fixed at 45° on the axis of the chamber 4, the orifice 12 of chamber 4 and the lenses 11, onto the workpiece 8 to be machined, placed for example on an object-carrier. The optical adjustments are provided so as to give a luminous field of dimensions appropriate to the optical marking; this luminous field is projected as previously through the intermediary of the lenses 11, passing through the orifice 12, the semi-transparent mirror 32 and the orifice 13 of the chamber 3, through the intermediary of the lenses 14 and mirrors 15 and 16 on to the screen 17, for example of semi-ground glass.

A further application of the invention will be described with reference to FIG. 4. It is known to construct mirrors which reflect a band of wave-lengths of light and are transparent to other wave-lengths. For example, as shown in FIG. 3, a neodymium glass has a coefficient of reflection which is very high in the infra-red raze, about 1.06μ and much less in the visible spectrum. By providing the mirror 40 (FIG. 4) with a thin layer of this material, it will reflect the laser beam but will be traversed by the visible image of the workpiece 8. It will be observed that the structure shown in FIG. 4 has the advantage of obviating the risk of errors which may arise with the sliding arrangement 3–4 shown in FIG. 1.

The same advantage is obtained according to a further application of the invention which will be described with reference to FIG. 5. The same parts are again found in this figure with the same reference characters. The laser head 1–2 is in this case also fixedly mounted in the chamber 4; the two tubular parts 6 and 7 are again perpendicular to the axis of the chamber 4, but their axes are slightly displaced, in correlation with a slight modification of the position of the mirrors 19 and 32, which are fixed at slightly less than 45° on the axis of the chamber 4. The two beams, optical and laser, thus have separate paths.

For certain applications, it may be necessary or simply preferable for the laser beam to strike the workpiece normally. This is obtained by the arrangement shown in FIG. 6, which is a modification of the arrangement of FIG. 5. In FIG. 6, the mirror 19 is fixed at an angle of 45° on the axis of the chamber 4 and the mirror 32 is fixed at slightly less than 45° on this axis. It will be noted with reference to the marking, that the slight obliquity of the light beam at 8 remains unnoticed by the user, because the observation of the screen 17 is effected exactly with the same slight obliquity.

The object on which the marking is effected may be illuminated either by diascopic lighting which permits examination of the contour of the object, or by projection lighting which permits the surface condition of the object to be studied, or by these two methods of lighting simultaneously.

The screen 17 on which the image of the object is projected may be a rotating screen provided with angular graduations, thus permitting any angular measurement to be made at the surface of the object.

Figure 7:
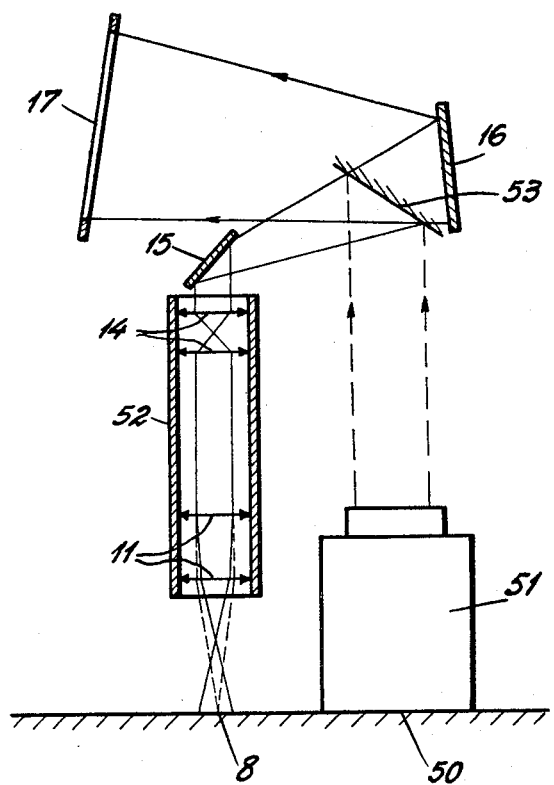
FIG. 7 is a cross-section showing the basic arrangement of another embodiment of the invention.

The object-carrier can be fixed or movable with respect to the screen 17 and can be provided with any device permitting displacements of the object to be measured. In this respect, a further application of the invention will be described with reference to FIG. 7. The frame 50 on which the workpiece 8 is mounted is mechanically fixed to the laser head 51; a tubular chamber 52 contains the lenses 11 and 14 and co-operates with the mirrors 15 and 16 and with the screen 17. The laser beam is transmitted onto the workpiece 8 through the intermediary of the lenses 11 and 14, the mirror 15, and a mirror 53 which may either be retractable or may be of the neodymium type described in connection with the mirror 40 of FIG. 4.

The device shown in FIG. 8 is similar to those which have just been described above, but therein the image of the object is projected onto a ground glass screen 60 extending perpendicular to the axis of the tubular portion 4. FIG. 9 shows this image on the ground glass screen 60. A circular field of light 61 with a cross 62, at the intersection of which the laser beam impinges at 63. The tubular portion 6 in FIG. 8 is fixed on a support 64 which can be formed by a part of a machine-tool.

Figure 10:
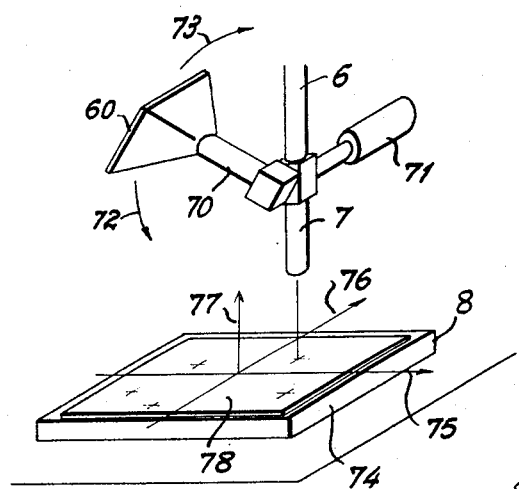
FIG. 10 is a perspective view of another form of construction of a device according to the invention, with a movable device for optical focussing on a ground glass screen.

The device shown in FIG. 10 is similar to that of FIGS. 1 and 8, but, in distinction, the tubular portion 70 of the chamber 4 is perpendicular to the axis of the laser head 71 and is movable in rotation in the direction of the arrows 72 or 73 in a plane parallel to the axis of the tubular portions 6 and 7. The screen 60 perpendicular to the axis of the portion 70 may thus be oriented in direction by the observer who carries out the optical adjustment. The object-carrier 74 is a plate movable in the directions as shown by the arrows 75, 76, 77, enabling the object to be moved in a plane perpendicular to the axis of the tubular portion 7, and along that axis.

The device shown in FIG. 10 permits of a particular use of the conventional tracing drawing to a scale of 1/1. This drawing 78 which may be drawn in any known manner so as to counteract variations of scale, for example on cartoline lined with aluminium, is fixed, for example by adherence, on the workpiece 8 to be machined, and the assembly is placed on the object-carrier 74. The marking is carried out point by point on the full scale sheet 78, each point being followed by its tracing, the laser beam effecting the optical tracing on the workpiece 8 to be machined by perforating and passing through the tracing sheet 78.

The device according to the invention can be mounted on any machine-tool on which an optical centering is effected, in particular on milling and boring machines, it being then possible to incorporate the projection screen in the body of the machine-tool.

Figure 11:
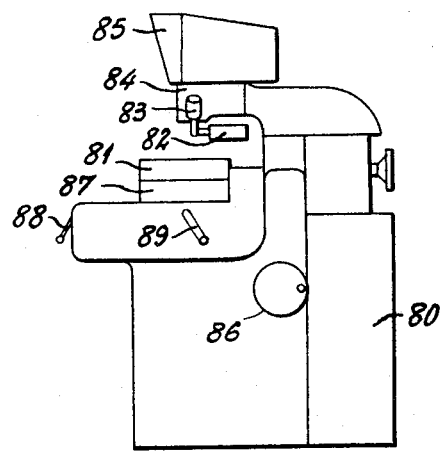
FIG. 11 shows an arrangement for mounting a device according to the invention on a machine tool.

FIG. 11 shows diagrammatically a mounting of this kind on a machine-tool 80 permitting the boring or milling of a workpiece carried by a movable marking table 81. The laser head 82 and the optical marking device 83 are fixed on the tool-carrier unit 84 which carries at its upper portion a screen 85 on which is projected an image of the workpiece. The tool carrier unit is movable vertically, the vertical displacements being controlled by means of a hand-wheel 86. The marking table 81 can slide in two slideways (not shown), one longitudinal and the other transverse in a fixed support 87. Controls 88, 89 enable the marking table to be locked respectively on the longitudinal slide and on the transverse slide. The object can thus be brought opposite the optical marking device and, in consequence, opposite the tools, by sliding the marking table 81 on the support 87. In order to effect the optical adjustment, it is then only necessary to move the tool-holder unit 84 vertically by means of the fly-wheel 86. Before employing the tools, the marking table 81 can be locked on the support 87 by means of the controls 88 and 89.

Figure 12:
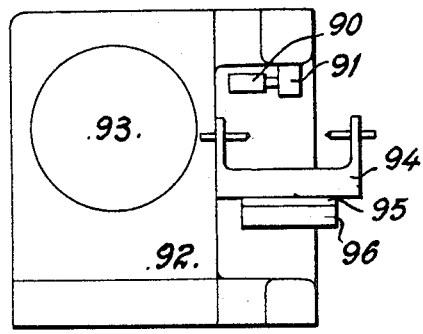
FIG. 12 shows the mounting of a device according to the invention on a projection checking apparatus.

FIG. 12 shows diagrammatically the mounting of a device according to the invention on a projection control device. A laser head 90 and an optical marking device 91 are fixed on a frame 92, in which is incorporated a ground glass screen 93, on which is projected the image of an object carried by a support 94 between centers. The support 94 can slide in the longitudinal guides of a table 95 pivotally mounted on a seating 96 of the frame 92. A unit of this kind enables the optical adjustment to be carried out on the surface of objects of any shape mounted between the centers of the support 94 and the carrying out of such an optical marking by means of the laser beam. The table 95, the seating 96 and the screen 93 can of course be provided with any kind of device for linear or angular measurements.

What we claim is:

1. A device for effecting optical viewing and marking of a workpiece, said device comprising an objective, an optical sighting system utilizing said objective, and a source of ordinary light, a laser head adapted for producing a laser beam, at least one focussing lens for the laser beam, a device adjacent the objective and opposite the workpiece for deviating the path of one of the two light beams, and positioning means for adjusting the position of the workpiece relative to said objective, such that in a first step of optical viewing said lighting means will illuminate the area around the point of said workpiece which is to be marked, and said objective and sighting system will produce an image of said area enabling visual alignment of said system onto the point to be marked by said positioning means, whereafter in a second step of actual marking, the beam of the laser head will be produced and focussed onto the point to be marked by said lens and said objective.

2. A device for effecting optical viewing and marking of a workpiece, comprising a main chamber, a tubular chamber slidable in said main chamber between two extreme positions, one corresponding to an optical viewing position and the other to a position in which the workpiece can be marked, a laser head in said chamber, a lens in said chamber adjacent said head for focussing the laser beam produced by said head, a mirror in said chamber mounted at a 45° angle relative to said beam for deflecting the same, first and second coaxial tubular portions mounted perpendicularly to and on said main chamber, lenses mounted in said second tubular portion for transmittal of the laser beam from said mirror and for transmittal of an image of the workpiece to said first tubular portion, and an optical viewing system including lenses mounted in said first tubular portion and mirrors and a screen for producing a projection of the image of the workpiece where it is to be marked, said sliding chamber in said one of its two positions permitting only the image of the workpiece to pass to the optical viewing system and in the other position, only the laser beam.

3. A device as claimed in claim 2, further comprising an extension on said main chamber extending coaxially therewith, said extension including a lighting means for producing a lighting beam and associated transmittal lenses for said beam, the sliding chamber containing a semi-transparent mirror at 45° which, in the extreme position of said sliding chamber corresponding to the optical viewing position, reflects the lighting beam towards the workpiece to be machined and is traversed by the image of the workpiece as it passes to the optical viewing system.

4. A device as claimed in claim 2, in which said main chamber is fixed on a support forming part of a machine-tool.

5. A device as claimed in claim 2, in which a tracing sheet to a scale ¼ is fixed on the workpiece, the marking being effected on the tracing sheet which is perforated by the laser beam.

6. A device for effecting optical viewing and marking of a workpiece, comprising a main chamber, a tubular chamber fixed in said main chamber, a laser head in said tubular chamber, a corrective lens in said tubular chamber adjacent said head for focussing the laser beam produced by said head, a mirror in said tubular chamber mounted at an angle of 45° with respect to said beam to reflect the same after it passes through the corrective lens, said mirror being reflecting for the laser beam and transparent for an optical beam of a projected image of a workpiece to be passed therethrough, first and second coaxial tubular portions mounted perpendicularly to and on said main chamber, lenses mounted in said second tubular portion for transmittal of the laser beam from said mirror and for transmittal of an image of the workpiece to said first tubular portion, and an optical viewing system including lenses mounted in said first tubular portion, mirrors and a screen for producing a projection of said image of the workpiece where it is to be marked.

7. A device for effecting optical viewing and marking of a workpiece, comprising a main chamber, a laser head in said chamber for producing a laser beam, a corrective lens in said chamber adjacent said head for focussing the laser beam and a first mirror mounted in said main chamber at an angle of about 45° relative to said laser beam for receiving the same from said lens and reflecting the beam, said main chamber including an extension coaxial therewith, lighting means and a second semi-transparent mirror mounted at an angle of about 45° in said extension of said main chamber, first and second parallel tubular portions mounted perpendicularly to and on said main chamber, lenses mounted in said second tubular portion for transmittal of the laser beam from said first mirror and for transmittal of an image of the workpiece to said first tubular portion, and an optical viewing system including lenses mounted in said first tubular portion, mirrors and a screen for producing a projection of said image of the workpiece where it is to be marked.

8. A device as claimed in claim 7, in which said first and said second mirror are mounted at angles of slightly less than 45° and the axes of said two tubular portions are slightly displaced with respect to each other.

9. A device as claimed in claim 7, in which said first mirror is mounted substantially at 45°, the second mirror being mounted at slightly less than 45°, and the axes of said two tubular portions being slightly displaced one with respect to the other.

10. A device for effecting optical viewing and marking of a workpiece comprising a frame for supporting a workpiece, a laser head for producing a laser beam, said laser head being fixed to said frame, a tubular chamber adjacent the frame and proximate the region of the workpiece to be marked, lens means mounted in said tubular chamber for transmittal of an image of the workpiece in the region where it is to be marked, a mirror mounted adjacent the tubular member for reflecting said image, an optical viewing system located at a position to receive the reflected image from the mirror for producing a projection of said image, and mirror means positioned relative to the laser head for reflecting the laser beam to the first said mirror whereat the laser beam is in turn reflected to said lens means and projected onto the workpiece.

11. A device as claimed in claim 10, wherein said mirror means is located between said first mirror and said optical viewing system and is reflective to the laser beam and transparent to the image from said mirror.

References Cited

UNITED STATES PATENTS

| | | | |
|---|---|---|---|
| 3,092,727 | 6/1963 | Leinhos et al. | 219—121 |
| 3,096,767 | 7/1963 | Gresser et al. | 219—121 |
| 3,118,050 | 1/1964 | Hetherington | 219—69 |
| 3,169,183 | 2/1965 | Radtke et al. | 219—121 |
| 3,236,994 | 2/1966 | Kodera et al. | 219—69 |
| 3,259,730 | 7/1966 | Wehde et al. | 219—69 |
| 3,265,855 | 8/1966 | Norton | 219—121 |
| 3,300,618 | 1/1967 | Sciaky | 219—121 |

RICHARD M. WOOD, *Primary Examiner.*

W. BROOKS, *Assistant Examiner.*